United States Patent
StJohns et al.

(10) Patent No.: US 8,756,675 B2
(45) Date of Patent: Jun. 17, 2014

(54) SYSTEMS AND METHODS FOR SECURITY IN A WIRELESS UTILITY NETWORK

(75) Inventors: Michael StJohns, Germantown, MD (US); Raj Vaswani, Portola Valley, CA (US); Aditi Dubey, Redwood City, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 705 days.

(21) Appl. No.: 12/187,354

(22) Filed: Aug. 6, 2008

(65) Prior Publication Data
US 2010/0037293 A1 Feb. 11, 2010

(51) Int. Cl.
G06F 7/04 (2006.01)
H04L 9/32 (2006.01)
H04L 29/06 (2006.01)

(52) U.S. Cl.
CPC .......... H04L 9/3263 (2013.01); H04L 63/0823 (2013.01)
USPC ........................................................ 726/10

(58) Field of Classification Search
CPC .......................... H04I 9/3263; H04I 63/0823
USPC ........................................................ 726/10
See application file for complete search history.

(56) References Cited

U.S. PATENT DOCUMENTS

| | | | | |
|---|---|---|---|---|
| 5,781,723 | A * | 7/1998 | Yee et al. | 726/20 |
| 6,314,521 | B1 * | 11/2001 | Debry | 726/10 |
| 7,089,089 | B2 | 8/2006 | Cumming et al. | |
| 7,707,415 | B2 * | 4/2010 | Braskich et al. | 713/168 |
| 7,814,315 | B2 * | 10/2010 | Parkinson | 713/158 |
| 7,814,322 | B2 * | 10/2010 | Gurevich et al. | 713/171 |
| 2003/0070070 | A1 * | 4/2003 | Yeager et al. | 713/157 |
| 2005/0086468 | A1 * | 4/2005 | Meandzija et al. | 713/156 |
| 2007/0094494 | A1 | 4/2007 | Banerjee et al. | |
| 2007/0245414 | A1 * | 10/2007 | Chan et al. | 726/12 |
| 2007/0283153 | A1 * | 12/2007 | Metke et al. | 713/169 |
| 2008/0022104 | A1 * | 1/2008 | Deishi | 713/175 |
| 2008/0063201 | A1 | 3/2008 | Wormald et al. | |
| 2008/0155661 | A1 * | 6/2008 | Arashin et al. | 726/4 |

OTHER PUBLICATIONS

WPA Deployment Guidelines for Public Access Wi-Fi Networks, 2004, retrieved from the Internet <URL: wifi.org/files/wp_6_WPA%20Deployment%20for%20Public%20Access_10-28-04.pdf>, pp. 1-47 as printed.*

(Continued)

*Primary Examiner* — Michael Chao
(74) *Attorney, Agent, or Firm* — Buchanan Ingersoll & Rooney PC

(57) ABSTRACT

Methods and systems a provided for security in a wireless utility network. The methods and systems use different levels of trust to securely enroll new nodes into a network through other nodes acting as proxies. A node's security state with respect to another node in the network is categorized into one of several trust levels. A node responds to certain requests, actions or messages depending based on its trust level with the other entity. Initially, a node is not trusted. A first trust level is established based on a digital certificate that is stored in a node when the node is manufactured. A second trust level is established based on a second digital certificate obtained from a certifying authority while a node is in the first trust level. A node with a verified second certificate can be fully enrolled in the network and participate as a network node with minimal or no constraints.

19 Claims, 2 Drawing Sheets

(56) References Cited

OTHER PUBLICATIONS

Chandra et al., WiFiProfiler: Cooperative Diagnosis in wireless LANs, 2006, Retrieved from the Internet <URL: portal.acm.org/citation.cfm?id=1134702>, pp. 1-15 as printed.*

RFC 3459, Internet X.509 Public Key Infrastructure Certificate and CRL Profile, Jan. 1999, Retrieved from the Internet <URL: tools.ietf.org/pdf/rfc2459>, pp. 1-129 as printed.*

Postel et al, RFC 793 Transmission Control Protocol, 1981, retrieved from the Internet <URL: ietf.org/rfc/rfc793.txt.pdf>, pp. 1-91 as printed.*

Simon et al, RFC 5216 The EAP-TLS Authentication Protocol, Mar. 2008, Retrieved from the Internet <URL: http://tools.ietf.org/pdf/rfc5216.pdf>, pp. 1-4 as printed.*

Rosenberg et al., RFC 3261 SIP: Session Initiation Protocol, 2002, Retrieved from the Internet <URL: http://tools.ietf.org/pdf/rfc3261.pdf>, pp. 1-5 as printed.*

IEEE Communications Magazine, Feb. 2008, vol. 46. No. 2, Published by IEEE, New York, pp. 112-139.

IEEE Communications Magazine, Apr. 2008, vol. 46. No. 4, Published by IEEE, New York, pp. 88-134.

International Search Report and Written Opinion issued in PCT/US2009/004450 dated Apr. 8, 2010.

Traynor et al. "Efficient Hybrid Security Mechanisms for Heterogeneous Sensor Networks", IEEE Transactions on Mobile Computing, vol. 6, No. 6, Jun. 1, 2007, pp. 663-677.

Perrig et al. "Spins: Security Protocols for Sensor Networks", Wireless Networks, vol. 8, No. 5, Sep. 1, 2002, pp. 521-534.

Liebeherr et al. "An Overlay Approach to Data Security in Ad-Hoc Networks", Ad Hoc Networks, vol. 5, No. 7, May 30, 2007, pp. 1055-1072.

Venkatraman et al. "A Novel Authentication Scheme for Ad Hoc Networks", Wireless Communications and Networking Conference, vol. 3, Sep. 23, 2000, pp. 1268-1273.

Zhou et al. "Securing Wireless Sensor Networks: a Survey", IEEE Communications Surveys, vol. 10, No. 3, Jul. 1, 2008, pp. 6-28.

English translation of the First Examination Report from the Taiwan Intellectual property Office (TIPO) issued on Sep. 3, 2012, in corresponding Taiwanese Application No. 098126328.

English translation of the Second Examination Report from the Taiwan Intellectual Property Office (TIPO) issued on May 2, 2013, in corresponding Taiwanese Application No. 098126328.

* cited by examiner

SYSTEMS AND METHODS FOR SECURITY IN A WIRELESS UTILITY NETWORK

BACKGROUND

Ensuring security in a wireless utility network poses difficult and unique challenges. Meters and other devices in the utility network can have lifetimes of over twenty years. Utility networks are publicly located and have limited physical protection. Furthermore, the sizes of utility networks, which may include millions of nodes, create constraints on resources for managing such networks.

SUMMARY

Embodiments consistent with the present disclosure provide methods and systems for security in a wireless utility network. The methods and systems use different levels of trust to securely enroll new nodes into a network through other nodes acting as proxies. A node's security state with respect to another node in the network is categorized into one of several trust levels. A node responds to certain requests, actions or messages depending based on its trust level with the other entity. Initially, a node is not trusted. A first trust level is established based on a digital certificate that is stored in a node when the node is manufactured (hereinafter "birth certificate"). Such interim trust levels allow a node to establish minimal communications with neighbor nodes in order to move towards obtaining the final trust level from the network's central trust-control server. A second trust level is established based on a second digital certificate (hereinafter "driver's license") obtained from a certifying authority while a node is in the first trust level. A node with a verified driver's license is enrolled fully in the network and participate as a full-fledged network node with minimal or no constraints.

DETAILED DESCRIPTION

Figure 1:
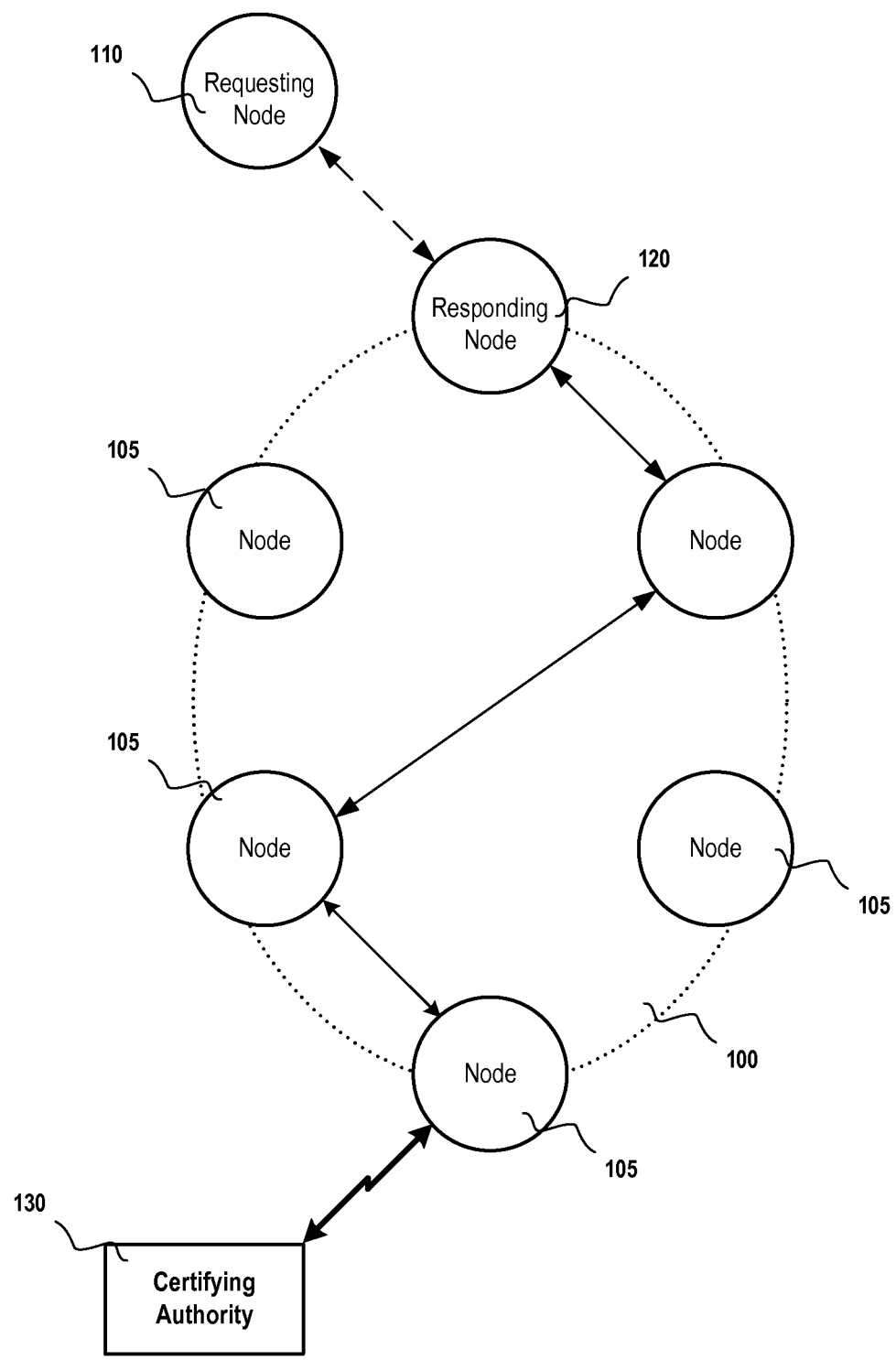
FIG. 1 is a block diagram illustrating an exemplary system consistent with embodiments disclosed herein.

FIG. 1 illustrates an exemplary system that includes a network 100 having nodes 105, including responding node 120. Additionally, network 100 includes a requesting node 110 and a certifying authority 130 are accessible by responding node 120. Network 100 may be a wired, fixed wireless, or mobile wireless links. In some embodiments, network 100 is a wireless utility network that monitors and controls a variety of nodes 110 that are devices for generating, distributing, monitoring and/or managing an electrical power service. These devices can connect customer resource consumption meters including for power, water and gas, and utility grid origination/distribution points with a group of network management servers (e.g., control centers) via combination of wireless networks, Access Points (e.g., gateways) and/or wide area networks (WANs).

Nodes 105 are enrolled in network 100. To be enrolled, nodes 105 have established a trusted state within network 100. Trusted means that the node has been given a copy of the system-specific root certificate, has been issued its own system-specific "driver's license" certificate, has proven through cryptographic means that it is the owner of said driver's license, and has established secured communications with one or more other trusted nodes within the system.

As shown by the dashed lines connecting requesting node 110 and responding node 120 in FIG. 1, requesting node 110 is not yet a member of network 100 and does not have full communicative connectivity with responding node 120. When requesting node 110 provides the necessary information and/or credentials to responding node 120, requesting node 110 may enroll in network 100 after establishing a partially-trusted level. When requesting node 110 fails to provide proper credentials, or the credentials are determined to be bogus, requesting node 110 is not allowed to enroll in network 100. Responding node 120 can refuse to proxy requesting node 110's enrollment after a number of failed attempts.

Responding node 120 is a trusted node enrolled in network 100 that receives a transmission from requesting node 110 and serves as a proxy for requesting node 110 in enrolling the node. For instance, in network 100, responding node 120 may be a node in transmission range of requesting node 110 that receives a wireless broadcast from requesting node 110, which is not enrolled in network 100. More than one node of network 100 may be in the transmission range of requesting node 110 but, for the sake of simplicity, only a single responding node 120 is discussed here.

Certifying authority 130 may be another node within network 100 or it can be a computing device located outside of network 100, for instance, behind a protected firewall. Certifying authority 130 stores keys and certificates for all nodes in network 100 from which it has received enrollment requests. Certifying authority 130 also issues driver's license to nodes 105 enrolled in network 100.

Nodes manufactured for network 100 are encoded with a unique identity that insures the trusted identity of the manufacturer. The unique identity serves as a "birth certificate" which is a credential issued by a manufacturer at the time of manufacturing a node that enables trust establishment regarding the manufacture of the device. The birth certificate is signed by the manufacturer and may contain information including a node identifier, manufacturing information, public key, and certificate authenticator. The node identifier may be a unique to the respective node and/or the node's network interface, such as a MAC address. The manufacturing information may describe node type, role (e.g., whether the node is a meter, network access point, relay, etc.), security configuration, and other information about the node known at the time the node was manufactured. The public key is one part of a public-private key pair, wherein the corresponding private key is stored on the node in non-volatile and optionally secure memory. The certificate authenticator includes identifying information and a signature of the manufacturing station that produced the node. The birth certificate can be verified by following a chain of trust from a specific Master Root Certificate (a copy of which is included in the node firmware), through one or more manufacturing process specific certificates, down to the birth certificate. For the example network, the Master Root Certificate is a self-signed digital certificate where the Private Key is held by an entity agreed upon to certify manufacturers of nodes. A digital certificate is a signed binding between an identity, a public key and optional attributes. ISO standard X.509 is one class of digital certificate amongst several available, and is used in this particular embodiment.

The combination of knowledge of the private key combined with the birth certificate is sufficient to uniquely and securely identify nodes 105 or other devices manufactured for the network operator. When requesting node 110 exchanges birth certificates with responding node 120, it allows negotiation of a secure connection to requesting node 110 to talk to neighboring nodes, such as the responding node 120 that are already enrolled and prove where it comes from as part of the enrollment process. Data can be extracted from the birth certificate to issue a driver's license by the certifying authority 130 that allows it to be fully enrolled and operational on a particular utility network.

Driver's license are credentials issued by certifying authority 130 and used by nodes 105 to prove that they are trusted to operate in network 100. A driver's license includes similar information as birth certificate, but is authenticated by certificate authority 130 by chaining back to system-specific root certificate. The System-Specific Root Certificate is created and issued by a system operator and is provided to each node to a) identify the system to which it belongs, and b) to verify driver's licenses sent to it from other nodes. In comparison to a driver's license, the information in a birth certificate is fixed. Information in a driver's license, however, can change since it defines a node's trust state with respect to a particular network, such as network 100. Each driver's license says different things about a node and about the trust the node should receive from other nodes and entities in the system.

Figure 2:
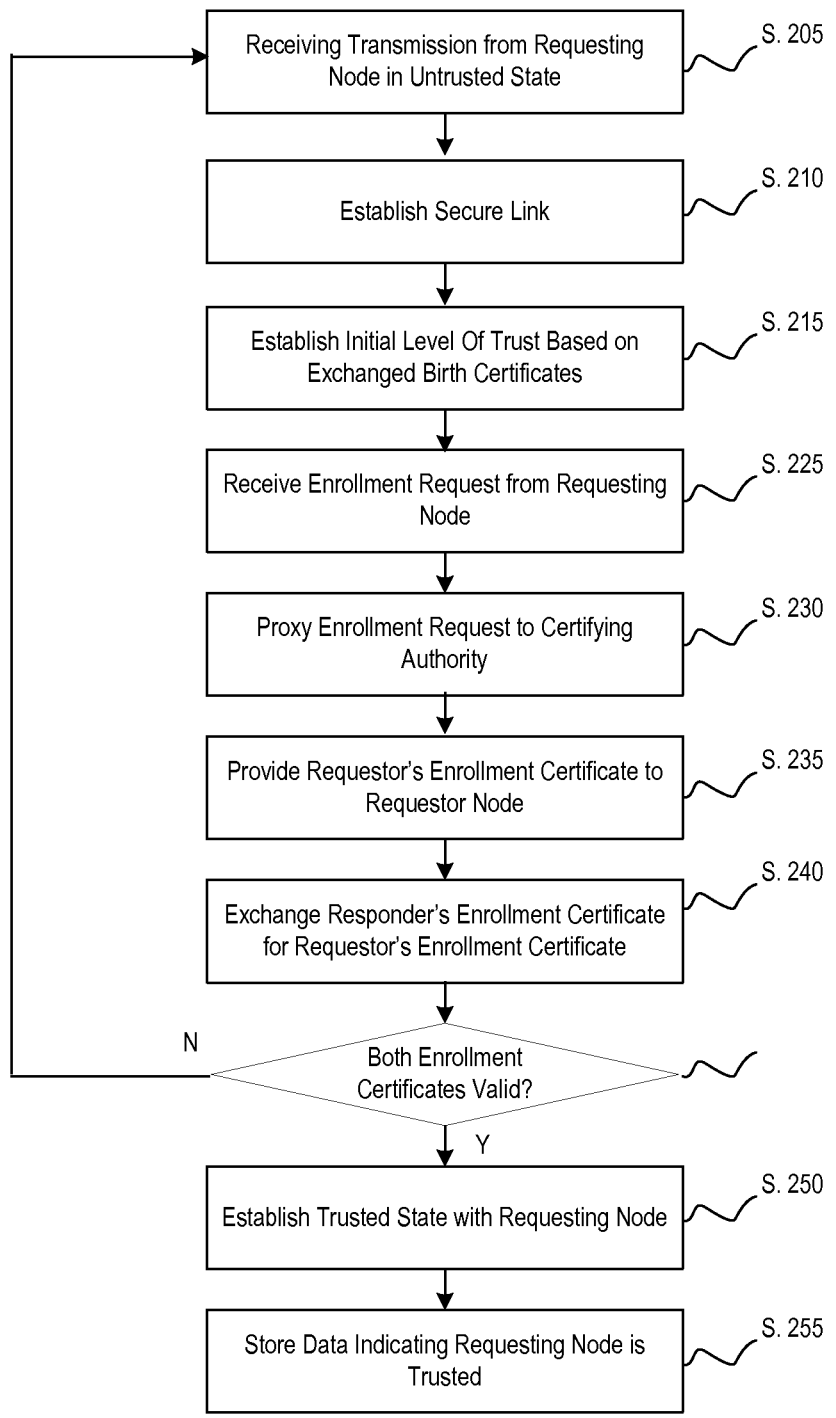
FIG. 2 is a flow chart illustrating an exemplary method of enrolling a node.

FIG. 2 is a flow chart illustrating an exemplary method (as identified in FIG. 1) for adding requesting node 110 to network 100. Before requesting node 110 can become enrolled on the network, at least one of its neighbors, such as responding node 120, must already be a trusted member of network 110 and have a connection to certifying authority 130.

If the responding node 120 enrolled is currently active (e.g., has a path to a network access point), the requesting node 110 will use responding node 120 as a proxy for enrollment. If, however, requesting node 110 already has a driver's license, then the node can negotiate a higher trust state without relying on node 120 to act as a proxy. If requesting node 110 does not already have a driver's license, it requests the license from responding node 120 and verifies the certificate validly chains to the master root certificate included in firmware. "Validly chains" means there is a chain of certificates from the Master Root Certificate to the birth certificate with the property that each link in the chain is a certificate consisting of material that identifies the certificate above it, and where the signature of the certificate was formed by the entity which holds the private key associated with the certificate above it, and where each signature can be validated as correct using specific cryptographic techniques. The final certificate in the chain—the Master Root Certificate is self-signed and can also be validated using this criterion.

Before exchanging birth certificates, requesting node 110 and responding node 120 establish a connection between them, but the nodes have not identified to whom the connection belongs. (Step 205) At this untrusted level, only the interactions directed toward establishing a higher trust state occur. For instance, only low-level, connection-related messages are accepted by responding node 120 from requesting node 110.

To enroll requesting node 110 in network 100, requesting node 110 and responding node 120 establish a secure link (Step 210). Requesting node 110 and responding node 120 can establish a layer-2 (link layer) secure link by, for example, negotiating a shared symmetric key. That key can be used as the key for a Hashed Message Authentication Check on messages sent between the two neighbors to prevent injection of fake or modified traffic into the link between the nodes. Link layer protection prevents modification or substitution of link layer messages that could result in network-level breaches, such as denial of service or routing black holes. Each pairs of communicating nodes negotiate a unique shared symmetric key to secure their communications using symmetric cryptography. Neighbor devices negotiate a shared secret using, for example, Diffie-Hellman, Elliptic-Curve Diffie-Hellman or similar algorithms. From that shared secret, the nodes independently derive the same symmetric key without ever sending the key over the link.

Using the secure link, requesting node 110 and responding node 120, exchange birth certificates to establish an initial level of trust and verifying chain of trust for certificates and for cryptographic material used to establish the shared key (Step 215). If, after exchange of birth certificates, requesting node 110 or responding node 120 is unable to verify the birth certificate chain of the other node, the other node is identified as bogus. This could happen with "fake" equipment or equipment from an uncertified vendor. In this state, the responding node blocks the link for most interactions and notes the requesting node as bad. It may accept certain messages from this neighbor on a limited access basis.

If, however, requesting node 110 and responding node 120 establish the initial level of trust based on the exchange of birth certificates, requesting node 110 may use responding node 120 as a proxy to request a driver's license from certifying authority, to report the lack of such a certificate to the back office, and to report certain operational parameters as permitted by policy. Requesting node 110 then sends an enrollment request to the proxy containing the same birth certificate provided before (Step 225). If the responding node 120 is not connected (has no path to an AP), it returns an exception response to the requesting node 110 that will wait a certain period of time before attempting to use this neighbor node 120 as a proxy. Otherwise, the proxy node sends an acknowledgement that it will attempt an enrollment on behalf of the new node 110.

Responding node 120 "proxies" enrollment request to one of several pre-defined operator certifying authorities using normal network forwarding mechanisms and any available wide-area back-haul network. (Step 230) The enrollment process conducted via a neighbor acting as the proxy to communicate to a central authority authenticates the new node as being allowed on the particular network, and issues the equivalent of a "driver's license" certificate to the new node that allows it to operate in a specified role in network 100.

Certifying authority 130 validates responding nodes 120's enrollment request and may perform other checks, such as whether requesting node 110 is scheduled to be installed, is there a work order, or the like. Certifying authority 130 verifies the node's birth certificate, verifies the origin (e.g. the proxies' bonafides), and generates a driver's license. The public key extracted from the birth certificate is bound into the driver's license that is signed by the certifying authority. As such, both the birth certificate and driver's license have the same public key, but a different chain of entities certifies each certificate.

Certifying authority sends the driver's license certificate and any necessary ancillary information (e.g., intermediate certificates) to the responding node 120. (Step 235) The responding node 120 sends the driver's license to the requesting node 110, which verifies that the driver's license is consistent with the requesting node's birth certificate, contains the requesting node's identifying information (e.g., MAC address), and chains to the system-specific root certificate, and which then installs the verified driver's license. If the driver's license fails to validate, requesting node 110 may enter a hold-down state for some defined period of time and then reattempt enrollment. If it fails in enrollment more than a configured number of times due to an invalid certificate, it ceases to attempt to enroll and an exception report is sent to responding node 120, which ceases enrollment of the requesting node 110.

Requesting node 110 and responding node 120 exchange driver's licenses. (Step 240) If valid, responding node 120 adds requesting node 110 the list of nodes it fully trusts. The proxy node 120 sends an enrollment request containing the new nodes certificate to a specific designated NP (back-office server).

Requesting node 110 reaches a trusted state after the node is able to retrieve a verifiable drivers license from the responding node 120. (Step 250) The requesting node 110 sends a copy of the driver's license to each neighboring nodes, such as responding node 120, and waits for acknowledgement of its upgraded trust status. (Step 255) Upon receipt of acknowledgment, the requesting node 110 can complete its registration (e.g. with other entities within the system) because its neighbor nodes will now carry its traffic. In this trusted state, the requesting node 110 will treat responding node 120 as part of the network and may use the responding node 120 to communicate with any other nodes in the network 100.

While illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as nonexclusive.

While certain features and embodiments of the invention have been described, other embodiments of the invention will be apparent to those skilled in the art from consideration of the specification and practice of the embodiments of the invention disclosed herein. Although exemplary embodiments have been described with regard to certain networks, the present invention may be equally applicable to other network environments having configurable, intelligent nodes. It is therefore intended that the specification and examples be considered as exemplary only, with a true scope and spirit of the invention being indicated by the following claims.

What is claimed is:

1. A method for enrolling a requesting and previously untrusted node in a network consisting of a plurality of trusted nodes, the method comprising:
    exchanging manufacturer originated digital certificates between the requesting node and a responding node, wherein the responding node is one of the plurality of trusted nodes;
    verifying a manufacturer originated certificate received from the requesting node, the manufacturer originated certificate having been stored in the requesting node when the requesting node was manufactured, containing a unique identifier of the requesting node so as to be unique to the requesting node, and including identifying information about a manufacturer that produced the requesting node at a time the requesting node was manufactured prior to enrolling the requesting node in the network;
    establishing a first trust state with the requesting node based on the manufacturer originated certificate received from the requesting node and a response manufacturer originated certificate sent to the requesting node from the responding node;
    while in the first trust state, sending, from one of the plurality of trusted nodes, an enrollment request to a certifying authority, the enrollment request including information extracted from the manufacturer originated certificate received from the requesting node;
    while in the first trust state, receiving, at one of the plurality of trusted nodes, a second digital certificate from the certifying authority, said second digital certificate being provided by the certifying authority based on a verification of the information extracted from the manufacturer originated certificate received from the requesting node;
    while in the first trust state, providing the second digital certificate to the requesting node, the second digital certificate including the information extracted from the manufacturer originated certificate of the requesting node;
    establishing a second, higher-level, trust state with the requesting node based on the second digital certificate received from the certifying authority and a second digital certificate of the responding node;
    while in the second trust state, enrolling the requesting node in the network; and
    in response to not being fully able to verify the authenticity of the requesting node within a preset time:
        maintaining one or more intermediate trusted states between the first and the second trust states; and
        subsequently requesting additional validation or repetition of the enrollment request,
    wherein the exchanging of the manufacturer originated certificates includes establishing a secure link between one of the plurality of trusted nodes and the requesting node, and
    wherein the establishing of the secure link includes:
        negotiating shared symmetric keys; and
        establishing a link layer (layer-2) secure link.

2. The method of claim 1, wherein each of the manufacturer originated certificates includes:
    a unique node identifier;
    manufacturing information of the node; and
    a public key corresponding to a private key stored at the node.

3. The method of claim 2, wherein each of the manufacturer originated certificates is signed by a certified manufacturing station.

4. The method of claim 2, wherein both the manufacturer originated certificate received from the requesting node and the response manufacturer originated certificate sent to the requesting node identify a role of the respective nodes in the network.

5. The method of claim 1, wherein the shared symmetric keys are independently derived by each node using a preset formula, and are not exchanged over the air.

6. The method of claim 1, wherein the responding node puts the requesting node in an un-trusted state in the event a response from the certifying authority is not received within a preset period of time, and wherein in the un-trusted state the responding node is prohibited from sending an enrollment request to the certifying authority on behalf of the requesting node.

7. The method of claim 6, wherein the responding node informs at least one other node in the network of the placement of the requesting node in the un-trusted state.

8. A system comprising:
    a secure network;
    a requesting node; and
    a responding node, wherein the responding node includes a data processor and a computer-readable medium having instructions stored thereon that, in response to execution by the processor, cause the processor to perform operations to control the responding node to enroll the requesting node in the network, the operations comprising:

exchanging manufacturer originated digital certificates with the requesting node;

verifying the manufacturer originated certificate received from the requesting node, the manufacturer originated certificate having been issued by the manufacturer when the requesting node was manufactured, containing a unique identifier of the requesting node so as to be unique to the requesting node, and including identifying information about the manufacturer that produced the requesting node at a time the requesting node was manufactured prior to enrolling the requesting node in the network;

establishing a first trust state with the requesting node based on the manufacturer originated certificate received from the requesting node and a response manufacturer originated certificate sent to the requesting node;

while in the first trust state, sending an enrollment request to a certifying authority, the enrollment request including information extracted from the manufacturer originated certificate received from the requesting node;

while in the first trust state, receiving a second digital certificate from the certifying authority, said second digital certificate being provided from the certifying authority based on a verification of the information extracted from the manufacturer originated certificate received from the requesting node;

while in the first trust state, providing the second digital certificate to the requesting node, the second digital certificate including the information extracted from the manufacturer originated certificate of the requesting node;

establishing a second, higher-level, trust state with the requesting node based on the second digital certificate received from the certifying authority and a second digital certificate of the responding node;

while in the second trust state, enrolling the requesting node in the network; and in response to not being fully able to verify the authenticity of the requesting node within a preset time:
maintaining one or more intermediate trusted states between the first and the second trust states; and
subsequently requesting additional validation or repetition of the enrollment request, wherein the exchanging of the manufacturer originated certificates includes establishing a secure link between the responding node and the requesting node, and wherein the establishing of the secure link includes:
negotiating shared symmetric keys; and
establishing a link layer (layer-2) secure link.

9. The system of claim 8, wherein each of the manufacturer originated certificates includes:
a unique node identifier;
manufacturing information of the node; and
a public key corresponding to a private key stored at the node.

10. The system of claim 9, wherein each of the manufacturer originated certificates is signed by a certified manufacturing station.

11. The system of claim 9, wherein both the manufacturer originated certificate received from the requesting node and the response manufacturer originated certificate sent to the requesting node identify a role of the respective nodes in the network.

12. The system of claim 8 wherein the shared symmetric key is independently calculated by each node using a preset formula, and is not exchanged over the air.

13. The system of claim 8, wherein the responding node puts the requesting node in an un-trusted state in the event a response from the certifying authority is not received within a preset period of time, and wherein in the un-trusted state the responding node is prohibited from sending an enrollment request to the certifying authority on behalf of the requesting node.

14. The system of claim 13, wherein the responding node informs at least one other node in the network of the placement of the requesting node in the un-trusted state.

15. A method for enrolling a new node in a network via a proxy node, said proxy node being a trusted member of the network, the method comprising:

exchanging manufacturer originated certificates with the proxy node;

establishing a first trust state with the proxy node based on a manufacturer originated certificate received from the new node via the proxy node and a response manufacturer originated certificate sent to the new node, the manufacturer originated certificate comprising a unique identifier of the new node known at the time the new node was manufactured so as to be unique to the new node, and including identifying information about the manufacturer that produced the new node at a time the new node was manufactured prior to enrolling the new node in the network;

while in the first trust state, receiving a second digital certificate from a certifying authority via the proxy node, said second digital certificate including information extracted from the manufacturer originated certificate of the new node;

while in the first trust state, authenticating the second digital certificate based on a previously provided system-specific root certificate;

establishing a second, higher-level, trust state with the proxy node based on the second digital certificate; and while in the second trust state, enrolling the new node in the network, wherein the exchanging of the manufacturer originated certificates includes establishing a secure link between the proxy node and the new node, and wherein the establishing of the secure link includes:
negotiating shared symmetric keys; and
establishing a link layer (layer-2) secure link.

16. The method of claim 15, wherein the information about the new node comprises one or more of:
a node type;
a node role;
security configuration; and
other information about the new node known at the time the new node was manufactured.

17. A method for enrolling a requesting and previously untrusted node in a network consisting of a plurality of trusted nodes, the method comprising:

exchanging manufacturer originated digital certificates between the requesting node and a responding node, wherein the responding node is one of the plurality of trusted nodes;

verifying a manufacturer originated certificate received from the requesting node, the manufacturer originated certificate having been stored in the requesting node when the requesting node was manufactured, containing a unique identifier of the requesting node so as to be unique to the requesting node, and including identifying information about a manufacturer that produced the requesting node at a time the requesting node was manufactured prior to enrolling the requesting node in the network;

establishing a first trust state with the requesting node based on the manufacturer originated certificate received from the requesting node and a response manufacturer originated certificate sent to the requesting node from the responding node;

while in the first trust state, sending, from one of the plurality of trusted nodes, an enrollment request to a certifying authority, the enrollment request including information extracted from the manufacturer originated certificate received from the requesting node;

while in the first trust state, receiving, at one of the plurality of trusted nodes, a second digital certificate from the certifying authority, said second digital certificate being provided by the certifying authority based on a verification of the information extracted from the manufacturer originated certificate received from the requesting node;

while in the first trust state, providing the second digital certificate to the requesting node;

establishing a second, higher-level, trust state with the requesting node based on the second digital certificate received from the certifying authority and a second digital certificate of the responding node;

while in the second trust state, enrolling the requesting node in the network; and in response to not being fully able to verify the authenticity of the requesting node within a preset time:
  maintaining one or more intermediate trusted states between the first and the second trust states; and
  subsequently requesting additional validation or repetition of the enrollment request, wherein the network is a utility network, and at least one of the requesting node and the responding node is configured to distribute commodity meter information to at least one other node in the utility network.

18. A system comprising:
a secure network;
a requesting node; and
a responding node, wherein the responding node includes a data processor and a computer-readable medium having instructions stored thereon that, in response to execution by the processor, cause the processor to perform operations to control the responding node to enroll the requesting node in the network, the operations comprising:
  exchanging manufacturer originated digital certificates with the requesting node;
  verifying the manufacturer originated certificate received from the requesting node, the manufacturer originated certificate having been issued by the manufacturer when the requesting node was manufactured, containing a unique identifier of the requesting node so as to be unique to the requesting node, and including identifying information about the manufacturer that produced the requesting node at a time the requesting node was manufactured prior to enrolling the requesting node in the network;
  establishing a first trust state with the requesting node based on the manufacturer originated certificate received from the requesting node and a response manufacturer originated certificate sent to the requesting node;
  while in the first trust state, sending an enrollment request to a certifying authority, the enrollment request including information extracted from the manufacturer originated certificate received from the requesting node;
  while in the first trust state, receiving a second digital certificate from the certifying authority, said second digital certificate being provided from the certifying authority based on a verification of the information extracted from the manufacturer originated certificate received from the requesting node;
  while in the first trust state, providing the second digital certificate to the requesting node;
  establishing a second, higher-level, trust state with the requesting node based on the second digital certificate received from the certifying authority and a second digital certificate of the responding node;
  while in the second trust state, enrolling the requesting node in the network; and
  in response to not being fully able to verify the authenticity of the requesting node within a preset time:
    maintaining one or more intermediate trusted states between the first and the second trust states; and
    subsequently requesting additional validation or repetition of the enrollment request,
  wherein the secure network is a utility network, and at least one of the requesting node and the responding node is configured to distribute commodity meter information to at least one other node in the utility network.

19. A method for enrolling a new node in a network via a proxy node, said proxy node being a trusted member of the network, the method comprising:
  exchanging manufacturer originated certificates with the proxy node;
  establishing a first trust state with the proxy node based on a manufacturer originated certificate received from the new node via the proxy node and a response manufacturer originated certificate sent to the new node, the manufacturer originated certificate comprising a unique identifier of the new node known at the time the new node was manufactured so as to be unique to the new node, and including identifying information about the manufacturer that produced the new node at a time the new node was manufactured prior to enrolling the new node in the network;
  while in the first trust state, receiving a second digital certificate from a certifying authority via the proxy node, said second digital certificate including information extracted from the manufacturer originated certificate of the new node;
  while in the first trust state, authenticating the second digital certificate based on a previously provided system-specific root certificate;
  establishing a second, higher-level, trust state with the proxy node based on the second digital certificate; and
  while in the second trust state, enrolling the new node in the network,
  wherein the network is a utility network, and at least one of the new node and the proxy node is configured to distribute commodity meter information to at least one other node in the utility network.

* * * * *